United States Patent [19]

Funk et al.

[11] Patent Number: 4,509,575
[45] Date of Patent: Apr. 9, 1985

[54] PNEUMATIC VEHICLE TIRE

[75] Inventors: Heinrich Funk, Burgwald; Henryk Pakur, Bückeburg; Hans Seitz, Langenhagen, all of Fed. Rep. of Germany

[73] Assignee: Continental Gummi-Werke Aktiengesellschaft, Hanover, Fed. Rep. of Germany

[21] Appl. No.: 599,533

[22] Filed: Apr. 12, 1984

[30] Foreign Application Priority Data

Apr. 16, 1983 [DE] Fed. Rep. of Germany ....... 3313854

[51] Int. Cl.³ .......................... B60C 15/06; B60C 9/08
[52] U.S. Cl. ........................... 152/356 R; 152/354 R; 152/361 R; 152/362 R; 152/362 CS
[58] Field of Search ............... 152/354 R, 356 R, 359, 152/356 A, 361 R, 361 FP, 361 DM, 362 R, 362 CS, 374, 355, 192, 193, 197, 198, 200–202

[56] References Cited

U.S. PATENT DOCUMENTS 3,118,482 1/1964 Beissner ..................... 152/362 CS X
3,557,860 1/1971 Maiocchi ....................... 152/362 R
3,682,223 8/1972 Simpson ................... 152/362 CS X
3,853,163 12/1974 Mezzanotte et al. ....... 152/362 R X
4,214,620 7/1980 Mezzanotte ................ 152/362 R X
4,265,292 5/1981 Inoue ....................... 152/362 CS X Primary Examiner—William A. Powell
Assistant Examiner—Thomas Bokan
Attorney, Agent, or Firm—Becker & Becker, Inc.

[57] ABSTRACT

A pneumatic vehicle tire having a belt and a radial carcass. Located laterally outwardly in the bead region are end portions of the carcass ply or plies which are guided upwardly, i.e. radially outwardly. Bead reinforcers are also provided. In order to achieve a great dynamic resilience along with sufficient stiffness of the bead regions, it is proposed pursuant to the present invention that the filaments of the bead reinforcers, and the strength carriers of the end portions of the carcass, be disposed at opposite inclines relative to the radial direction. Furthermore, in the vicinity of their outer ends, these filaments and strength carriers form a smaller angle with the circumferential direction of the tire than do those portions thereof in the bead core region, so that these reinforcing inserts are thus disposed in such a way that they extend in a curved manner.

7 Claims, 3 Drawing Figures

PNEUMATIC VEHICLE TIRE

BACKGROUND OF THE INVENTION

THE present invention relates to a pneumatic vehicle tire having a pull-resistant belt and a radial carcass. The strength carriers of the carcass are anchored in the tire beads by being looped around the bead cores. Disposed laterally outwardly in the bead region are upwardly directed, i.e. radially outwardly directed, end portions of the carcass ply or plies. Also provided are bead reinforcers which are comprised of filaments or the like which are disposed in cord plies and extend at an angle to the radial direction relative to the tire body.

In pneumatic vehicle tires having a radial carcass it is customary to dispose the filaments of the carcass in such a way that not only those portions thereof which are continuously guided from one bead to the other, but also those end portions of the carcass plies which are disposed laterally outwardly in the bead region and are guided upwardly, or at least the filaments or the like which form these portions, are disposed in a radial arrangement. It is furthermore known to place bead reinforcers, which comprise threads, filaments, or the like which are disposed in cord plies, in such a way that these filaments of the bead reinforcer form a cross banding with one another, and possibly also form a triangualr arrangemnt with the reinforcing inserts of the carcass. It is also known to dispose the carcass inserts located in the region of the tire beads in such a way that the carcass filaments in this region form an angle with the radial direction on both sides of the bead cores, i.e. in the inner and the outer portions.

The purpose of all of the proposals of this type is to strengthen the tire beads.

The present invention proceeds from the recognition of the fact that carcass strength carriers disposed in the radial direction in that portion which is guided from bead to bead, and in the aformentioned end portion which is guided upwardly or radially outwardly, can lead to undesirable stiffening, and in particular to hardening during dynamic stressing.

It is therefore an object of the present invention to construct the bead portions of the tire in such a way that they have a relatively great dynamic resilience, yet are stiff enough in order to sufficiently and reliably absorb those stresses in the bead region which are operative when oblique and transverse forces are applied.

It is a further object of the present invention to obtain a more harmonic transition, along with more favorable strength, between the reinforced bead regions and the highly flexible side walls located thereabove.

BRIEF DESCRIPTION OF THE DRAWING

These objects, and other objects and advantages of the present invention, will appear more clearly from the following specification in conjunction with the accompanying drawing, in which.

SUMMARY OF THE INVENTION

Figure 1:
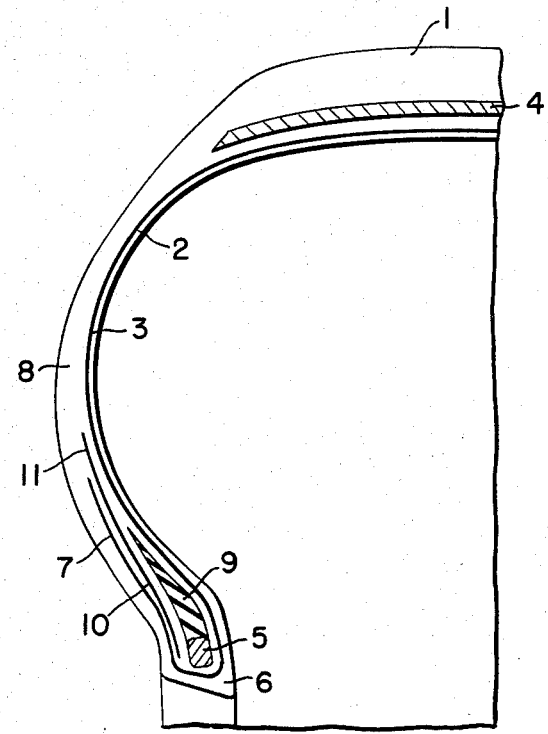
FIG. 1 is a schematic partial radial section through one inventive embodiment of a pneumatic vehicle tire.

The pneumatic vehicle tire of the present invention is characterized primarily in that the filaments or the like of the bead reinforcer on the one hand, and the strength carries of the end portions of the carcass on the other hand, extend at opposite inclines relative to the radial planes determined by the axis of the tire; in the vicinity of their outer, i.e. radially outer, ends, there filaments and strength carriers form a smaller angle with the circumferential direction of the tire than do their sections in the bead core region.

The important thing is that if a radial carcass is present, the laterally disposed end portions of the carcass do not extend radially, but rather extend at an incline; furthermore, they form an angle with the associated bead reinforcers or the filaments forming the same, and in particular in such a way that thses strength carriers assume different directions of incline relative to the radial direction of the tire. In addition, the angles of all of the filaments and strength carriers change, with their angles changing relative to the radial direction of the tire, and in particular in such a way that at the outer edge of the bead reinforcers, or at the free edge of the aforementioned carcass end region, the filaments and strength carriers form comparatively smaller angles with the circumferential direction of the tire.

This deliberately avoids having on both sides of a given bead core filaments, wires, or the like which extend radially and hence are parallel to one another. Furthermore, the closer the filaments of the bead reinforcers, and the strength carriers of the end portions of the carcass, are to the tire shoulders, the smaller are the angles which they form with the circumferential direction of the tire.

The aforementioned filament course at the upper, i.e. radially outer, end of the carcass end portions, and at the upper end of the filaments which form the bead reinforcers, also has the great advantage that the bead portions with greater dynamic resilience, are in the postion to absorb relatively large peripheral forces, in other words, such forces which result, for example, during turning.

Pursuant to further specific features of the present invention, the strength carriers of the radial carcass, in those portions thereof which are guided in an uninterrupted manner form one bead to the other, also advance radially in the bead region.

The bead reinforcers, at least over the greatest of their width, may be covered by the laterally outwardly disposed end portions of the carcass.

In the bead core region, the strength carriers of the carcass end portions may form an angle of approximately 90° with the circumferential direction of the tire, and at their free ends may form an angle of approximately 50° with the circumferential direction. At the internally, i.e. radially inwardly, located edge, the filaments of the bead reinforcers may form an angle of approximately 18° with the circumferential of the tire, and at the outer, i.e. radially outer, periphery may form an angle of approximately 14° with the circumferential direction.

If the strength carriers of the end portions of the carcass extend radially beyond the bead reinforcers, that portion which extends beyond the bead reinforcers is bent or offset toward the radial direction.

Although the end regions of the carcass and the bead reinforcers are disposed directly adjacent to one another, over the greatest portion of their radial extension they are separated by a triangular rubber strip from that portion of the strength carriers of the radial carcass which extends radially and is guided in an uninterrupted manner from one bead to the other.

DESCRIPTION OF PREFERRED EMBODIMENTS

Referring now to the drawing in detail, the tire body, which is essentially made of rubber or rubber-like material, has a profiled or nonskid tread strip 1 and a carcass 2 which comprises radially extending filiform strength carriers or cords 3. A belt 4 of the type known in the art is disposed between the tread strip 1 and the carcass 2. The belt 4 is pull-resistant in the circumferential direction of the tire, and essentially extends over the width of the tread surface. The strength carriers 3 of the radial carcass 2 are anchored in the beads 6 by being looped around respective annular bead cores 5. For this purpose, the radial carcass 2 is provided with laterally outwardly disposed end portions 7 which end in the tire side walls 8 at approximately one-third of the height of the tire body.

The bead cores 5 are respectively capped by a hard, essentially triangualr profiled rubber member 9, the width of which gradually decreases in the radially outward direction.

A bead reinforcer 10 is disposed between the rubber member 9 and the end portion 7 of the carcass 2. The bead reinforcer 10 comprises parallel threads or filaments 11 which are disposed in a cord ply. Thus, the bead reinforcer 10 is disposed adjacent to the end portion 7, but projects slightly beyond the latter in the radially outward direction.

Figure 3:
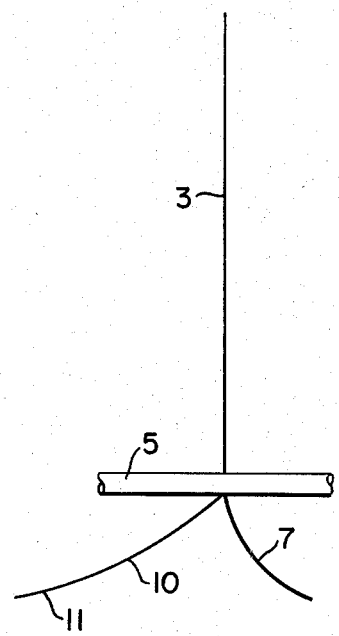
FIG. 3 again shows the course of the reinforcing inserts of FIG. 2 with the aid of individual filaments which are disposed in a single plane.
Figure 2:
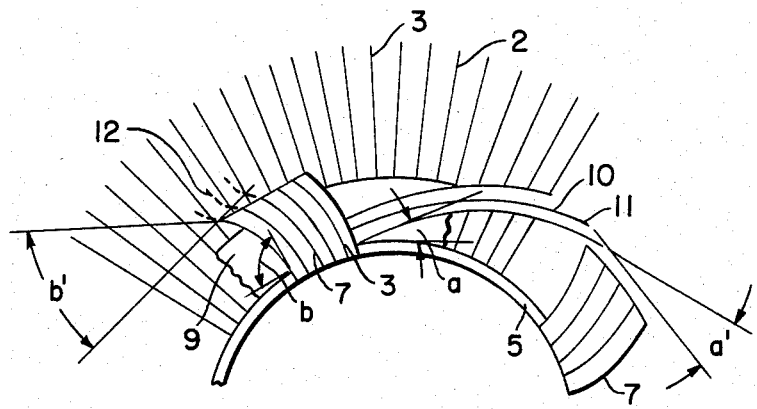
FIG. 2 is a partially broken-away side view of the tire of FIG. 1 showing the reinforcement thereof.

Of particular significance is the course of the filaments of the end portions 7 and of the bead reinforcers 10. This course can be seen particularly clearly in FIGS. 2 and 3. The strength carriers 3 of the end portions 7 extend in a first direction of incline, while the filaments 11 of the bead reinforcers 10 are oppositely inclined, but with the restriction that the strength carriers 3 advance slightly more steeply relative to the radial direction than do the filaments 11, which overall extend more flatly. Futhermore, the filaments 11, and the strength carriers 3 in the end portions 7, are curved, with the restriction that the filament angle (angle "b" for the strength carriers 3 and the angle "a" for the filaments 11) gradually become smaller when viewed from radially inwardly toward radially outwardly. Thus, the angle "a" decreases from approximately 18° to the value "a" of approximately 14° while the angle "b", which starts at 90°, changes over into a smaller angle of "b" of 50°. There thus results an asymmetrical cross banding having respect to the circumferential direction of the tire body a steeper advance of the strength carriers 3 and a flatter advance of the filaments 11.

On that side of the rubber member 9 opposite the bead reinforcer 10, there is disposed that portion of the radial carcass 2 having the strength carriers 3 which is guided in an uninterrupted manner from one bead core 5 to the other bead core 5. Thus, the radial course of these strength carriers 3 is also provided in the bead region.

If all of the reinforcing inserts of the base or foot of the tire are viewed from one side, a triangular arrangement results, though the tensilely prestressed carcass strength carriers 3 are disposed to extend radially along the inside of the tire.

The changing angles of the end portions 7 and of the filaments 11, as described above, lead to a desirable peripheral extension of the tire bead portions, but not to a significant stiffening, during bulging or deflection of the tire side walls 8.

In the event that the strength carriers 3 of the end portions 7 should radially outwardly extend beyond the free ends of the filaments 11, deflected or offset end portions 12 (see FIG. 2) can also be provided, these end portions 12 being bent toward the radial direction of the tire. However, this course is only provided for the aforementioned special situation in which the end portions 7 are longer.

The present invention is, of course, in no way restricted to the specific disclosure of the specification and drawing, but also encompasses any modifications within the scope of the appended claims.

What we claim is:

1. A belted pneumatic vehicle tire having a radial carcass with strength carriers which are anchored in the tire beads by being looped around the bead cores thereof; each carcass strength carrier is provided with a portion which extends uninterrupted from one bead to the other, and with two end portions, each of which is disposed laterally, respectively axially, outwardly of the associated bead core, and is guided radially outwardly from the associated bead; also provided are bead reinforcers composed of filaments which are disposed in a cord ply and extend at an incline to the radial direction of said tire;

the improvement comprises the arrangement of said filaments of said bead reinforcers, and of said strength carriers of said end portions of said carcass, with said filaments of said bead reinforcers on the one hand, and said strength carriers of said end portions on the other hand, extending at oppositely directed inclines relative to radial planes determined by the axis of said tire, or relative to the circumferential direction of said tire; each of said strength carriers of said end portions has a radially outer portion which extends at a first angle relative to the circumferential direction of said tire, and a portion in the vicinity of the associated bead core which extends at a second angle relative to the circumferential direction of said tire, with said first angle of said radially outer portion of each strength carrier being less than said second angle of said bead core portion of each strength carrier in the end portion of the latter; each of said filaments of said bead reinforcers has a radially outer portion which extends at a first angle relative to the circumferential direction of said tire, and a portion in the vicinity of the associated bead core which extends at a second angle relative to the circumferential direction of said tire, with said first angle of said radially outer portion of each filament being less than said second angle of said bead core portion of each of said filaments.

2. A tire according to claim 1, in which said uninterrupted portion of each of said strength carriers of said radial carcass also has a radial disposition in said beads.

3. A tire according to claim 1, in which said bead reinforcers are essentially disposed between said uninterrupted portions and said end portions of said carcass strength carriers; and in which the greatest portion of said bead reinforcers is covered by said end portions of said carcass strength carriers.

4. A tire according to claim 1, in which said first angle of said radially outer portion of each strength carrrier is approximately 50°, and said second angle of said bead core portion of each strength carrier in the end portiion of the latter is approximately 90°.

5. A tire according claim 1, in which said first angle of said radially outer portion of each filament is approximately 14°, and said second angle of said bead core portion of each of said filaments is approximately 18°.

6. A tire according to claim 1, in which said end portions of said carcass strength carriers extend radially beyond said bead reinforcers, with the strength carriers in the portion extending beyond said bead reinforcers being deflected toward the radial direction.

7. A tire according to claim 1, in which said end portions of said carcass strength carriers are disposed directly adjacent to said bead reinforcers; and which includes a triangular rubber member which separates said end portions and said bead reinforcers on the one hand, along the greatest portion thereof, from said radially extending, uninterrupted portion of said carcass strength carriers on the other hand.

\* \* \* \* \*